United States Patent [19]
Pantev

[11] Patent Number: 5,605,410
[45] Date of Patent: Feb. 25, 1997

[54] CONNECTING MECHANISM FOR TUBULAR FRAME MEMBERS

[76] Inventor: George Pantev, 310 Millway Ave., Unit 11, Concord, Ontario 14 K3W3, Canada

[21] Appl. No.: 372,995

[22] Filed: Jan. 17, 1995

[51] Int. Cl.⁶ ............................................. F16B 2/04
[52] U.S. Cl. ........................ 403/297; 403/174; 403/175; 403/176
[58] Field of Search ........................ 403/169, 170, 403/176, 174–175, 172, 173, 171, 178, 217–219, 297, 409.1, 405.1, 362, 264; 211/182, 190, 191, 187; 248/219.4

[56] References Cited

U.S. PATENT DOCUMENTS

| | | | |
|---|---|---|---|
| 2,863,682 | 12/1958 | Canepa | 403/175 |
| 3,545,625 | 12/1970 | MacMillan | 403/297 X |
| 3,620,558 | 11/1971 | MacMillan | 403/362 X |
| 3,701,553 | 10/1972 | Vogt | 287/54 |
| 3,740,085 | 6/1973 | Evans | 403/362 |
| 4,161,375 | 7/1979 | Murphy | 403/169 |
| 4,190,283 | 2/1980 | Boucher | 403/170 X |
| 4,207,014 | 6/1980 | Worallo | 403/187 |
| 4,358,214 | 11/1982 | Shull | 403/264 X |
| 4,714,370 | 12/1987 | Chen | 403/217 |
| 4,915,535 | 4/1990 | Willetts | 403/191 |

FOREIGN PATENT DOCUMENTS

| | | | |
|---|---|---|---|
| 548983 | 7/1956 | Belgium | 403/297 |
| 1514258 | 2/1960 | France | 403/175 |
| 1276390 | 10/1961 | France | 403/176 |
| 2478754 | 9/1981 | France | 403/405.1 |
| 608407 | 9/1960 | Italy | 403/171 |

*Primary Examiner*—Harry C. Kim
*Attorney, Agent, or Firm*—Klein & Vibber P.C.

[57] ABSTRACT

A connector is provided for joining hollow elongate frame members, such as tubes, to a support structure such as an other tube. The connector has a base portion with inner and outer faces, the inner face being shaped to conform to the shape of the adjacent surface of the support structure. The connector has at least one spreading mechanism extending outwardly from the base portion and having external transverse dimensions enabling it to be inserted into an end of the elongated frame member. This mechanism has parallel first and second arms located adjacent to each other. A screw is located in a threaded hole extending transversely through the first arm. This screw can be used to push against the second arm and thereby spread the arms apart. The base portion can have a hole formed therein to receive an elongate fastener used to connect it to the support structure. In a preferred embodiment, the second arm is divided into two parallel prongs separated by a narrow slit.

22 Claims, 7 Drawing Sheets

CONNECTING MECHANISM FOR TUBULAR FRAME MEMBERS

BACKGROUND OF THE INVENTION

The present invention relates to connectors for tubular members having either round or rectangular transverse cross-sections.

A variety of connectors are known for joining together tubular members having either a square or circular transverse cross-section. For example, if two tubular members are to be connected end to end, a cylindrical pin connector which extends into the adjacent ends of the tubes can be used. The tubes can be secured in place by means of set screws extending through the wall of each tube and into the pin connector. Similarly, it is possible to use a sleeve-type connector into which the ends of the tubes are inserted. However, such simple connectors are not suitable for connecting tubes or frame members together where members extend at an angle to one another or where a number of tubes or hollow frame members must be connected together at a single joint.

It will be appreciated that there are a number of uses for connectors which join tubular or hollow frame members together. Such connectors can be used in the construction of such things as furniture, playground equipment, display exhibits, sound and concert stages, elevated flooring, etc.

British patent application No. 2,006,379 published May 2, 1979, describes a connector for tubular members which employs an expandable spigot that is inserted in the end of the tubular member. The connector has a base which is fixedly connected to the support structure. The spigot has a pair of integral arms that extend from opposite edges of the base. The arms are formed with inwardly directed, similar portions that are separated by a narrow slot. The tubular member is secured on the spigot by means of a screw with a pointed leading end. This screw cooperates with a corresponding tapped opening formed in the wall of the tubular member. By turning the screw, it enters the slot and expands the spigot into locking engagement. This connector can be made in one piece from metal such as aluminum or aluminum alloy.

International PCT patent application published under No. W093/19639 on Oct. 14, 1993, describes furniture made with a tubular underframe. Expandable assembly means are used to connect the legs and rails and to make up the rails. Each assembly device comprises two connecting members that are inserted in the end of the adjacent tube. One or more screws are passed through an opening in one of the connecting members and by turning this screw the connecting members are pressed against the inner side of the tube end. The pointed screw passes through an aperture formed in the side of the tube and the screw is threaded through a nut mounted in one of the two connecting members. The distal end of the screw pushes against a pressure plate mounted in the other connecting member. One difficulty with the assembly devices of this published international application is that they are not particularly suited for general use or for connecting a tubular member to a further tubular member extending at a right angle to the first tubular member and of similar size.

SUMMARY OF THE INVENTION

According to the present invention, a connector for joining one or more tubular members to a support structure includes a base portion having an inner face and an outer face, the inner face formed to rest against said support structure to enable joining of the connector to the support structure. The outer face has at least one fork extending outwardly from the base portion and is dimensioned to closely fit an internal cross section of a tubular member. The first fork has substantially parallel, spaced apart first and second arms, the second arm being further subdivided into two parallel prongs having a slit therebetween. The first arm has a transverse threaded hole therethrough aligned with the slit. The arms can be expanded apart in a first direction and the prongs expanded apart in a direction substantially normal thereto when a selected threaded member is screwed into the threaded hole so as to push against both of the prongs and extend into the slit.

Preferably the connector includes a threaded fastener for mounting the connector to the supporting structure. The supporting structure can be a tubular member with a round transverse cross section, in which case the inner face is semi-cylindrical with a radius corresponding to the radius of the outer surface of the tubular member.

According to another aspect of the invention, a connector for joining hollow, elongate frame members to a support structure includes a base portion having an inner face and an outer face with the inner face shaped to conform to the shape of an adjoining surface of the support structure to which the connector is to be joined. At least one spreading mechanism extends outwardly from the base portion and has external transverse dimensions to enable the or each spreading mechanism to be inserted into one end of one of the elongate frame members and to fit closely the internal cross-section of its respective elongate frame member. The spreading mechanism has substantially parallel first and second arms located adjacent each other with the first arm having a transverse threaded hole extending therethrough. An elongate threaded member is located in this hole and is able to be turned in the hole so as to push against the second arm and thereby spread the first and second arms apart. The base portion has an aperture formed therein to receive an elongate fastener used to connect the base portion to the support structure. The aperture extends from the outer face to the inner face and has a central axis. The central axis extends at an acute angle to longitudinal axes of the first and second arms.

In one embodiment, each of the first and second arms has a flat inside surface facing the inside surface of the other arm and spaced therefrom. Also, each arm has a curved exterior surface which is substantially semi-circular or semi-elliptical in transverse cross-section. The preferred connector is formed from aluminum or aluminum alloy.

Further features and advantages of the connector will become apparent from the following detailed description taken in conjunction with the drawings.

BRIEF DESCRIPTION OF THE DRAWINGS

The connector for joining elongate members in accordance with the invention will now be described in greater detail, by way of example, with reference to the accompanying diagrammatic drawings, in which.

DESCRIPTION OF PREFERRED EMBODIMENTS

Figure 1:
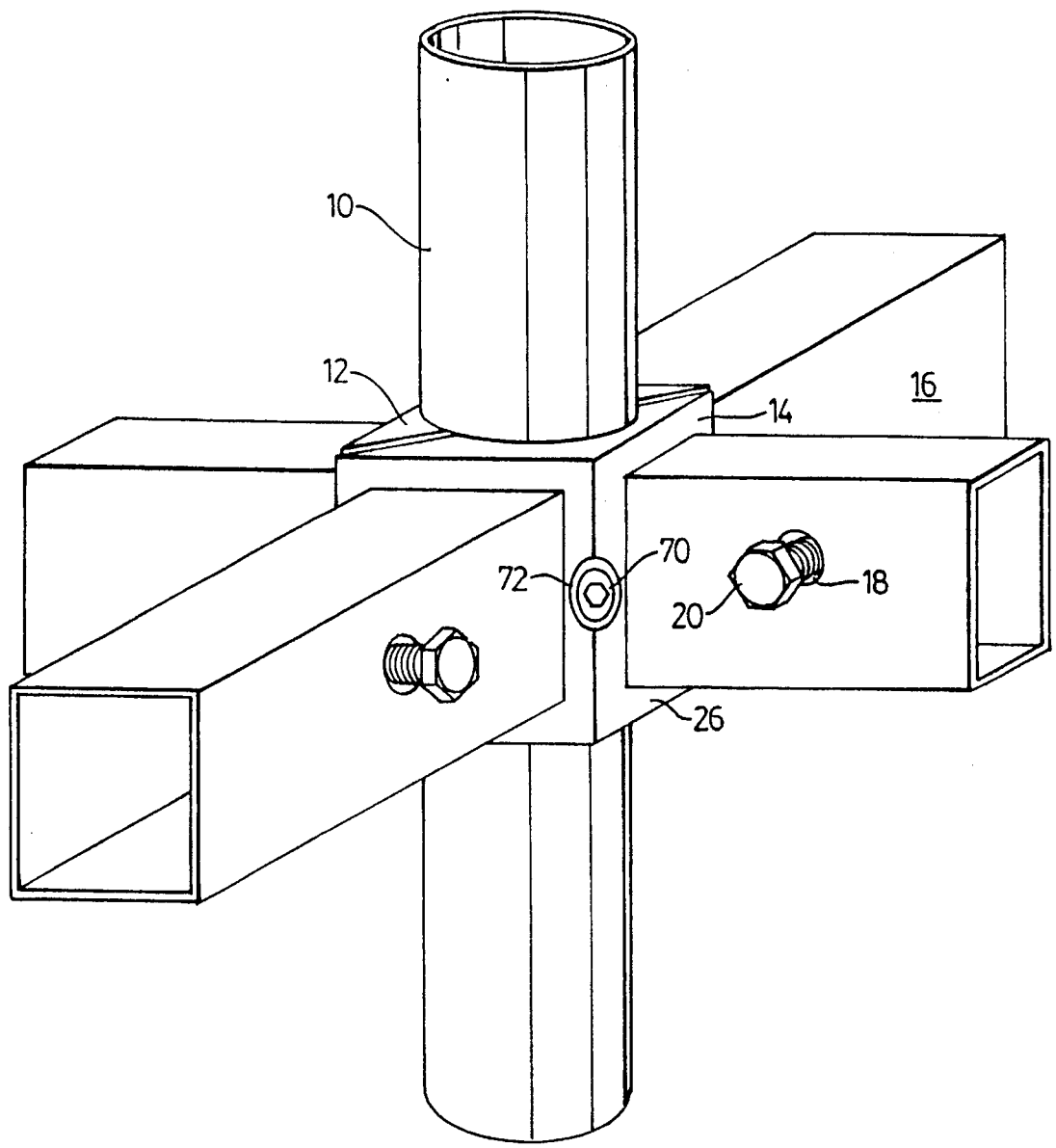
FIG. 1 is a perspective view illustrating the use of two connectors constructed in accordance with the invention to connect tubular members having a square cross-section to an upright tubular support having a round cross-section.

FIG. 1 illustrates how two connnectors constructed in accordance with the invention can be used to connect a number of tubular members to an upright support structure 10 which, as illustrated, is itself a tubular member having a round cross-section. In the present application, the term "tubular member" or "tube" shall be used to refer to an elongate, hollow frame member of circular, elliptical or rectangular transverse cross-section. As shown in FIG. 1, two connectors 12 and 14 are being used to connect four tubular members 16, which have a square or rectangular cross-section both internally and externally. Each of these tubular members 16 has a hole 18 in one side for the passage of a screw or bolt 20 used to connect the respective tubular member to the connector of the invention.

Reference will now be made to the preferred embodiments of the present connectors illustrated in FIGS. 2 and 3. The connector 13 of FIG. 2 has only one fork mechanism or spreading mechanism 22 while the embodiment of FIG. 3 has two forks 22 and 24. Each version has a similar base portion 26 having an inner face 28 and an outer face 30. The inner face is shaped to conform to the shape of an adjacent surface of the support structure 10, which may be flat or curved to which the connector is to be joined. Thus, as the connectors 13 and 14 are each designed to be connected to a tubular member having a round transverse cross-section, the base portion has a semi-cylindrical inner face. Similarly, if the connectors 13 and 14 are each designed to be connected to a tubular member having a square or rectangular cross-section, the base portion has a flat inner face. The outer face may be divided into two planar surfaces 32 and 34 that extend perpendicular to each other.

The fork or spreading mechanism 22, 24 extends outwardly from the base portion 26 and extends perpendicular to the adjacent planar surface 32 or 34. This fork has external transverse dimensions to enable the fork to be inserted into the end of the tubular frame member and to fit closely the internal cross-section of this frame member. The fork has substantially parallel, spaced apart first and second arms 36 and 38. Preferably, the second arm is further divided into two parallel prongs 39 and 40 having a narrow slit 42 therebetween. The first arm has a transverse threaded hole 44 extending therethrough, which hole is clearly illustrated in FIGS. 8 and 9. Into this hole is threaded a suitable threaded member such as the bolt 20 or a screw. If a bolt is used or a screw having a head, the length of the bolt or screw must be sufficient so that the head will not interfere with the expansion operation of the connector. Although a bolt 20 is shown in the drawings, it will be appreciated that one could also use headless screws that would not project from the side of the tubular frame member and that may therefore provide a more pleasing aesthetic appearance. By turning the pointed bolt, the first arm 36 and second arm 38 will expand apart in a first direction indicated by the double headed arrow A in FIG. 3. In addition, the two prongs 39, 40 will be expanded in a direction substantially normal to the first direction, that is in the direction of the double headed arrow B shown in FIG. 3.

Figure 8:
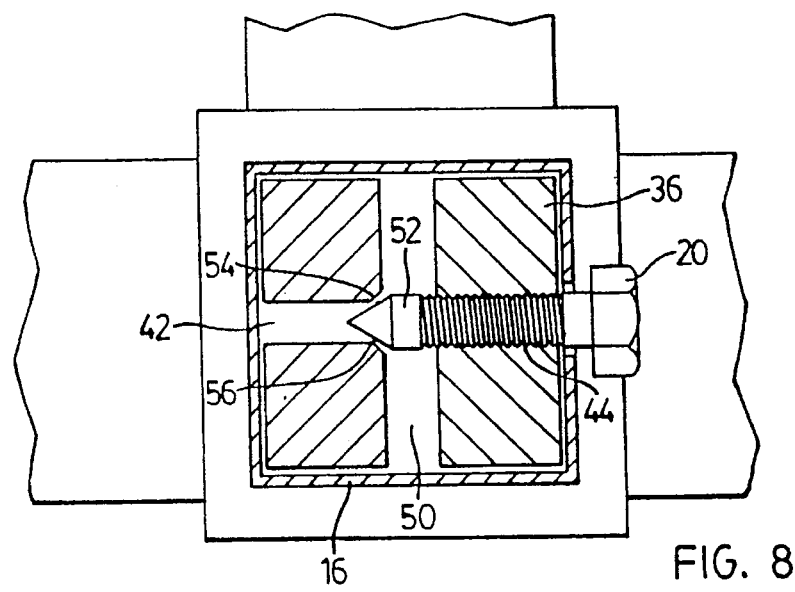
FIG. 8 is a vertical cross-section showing the operation of the fork portion of the connector, this view being taken along the line VIII—VIII of FIG. 5.
Figure 9:
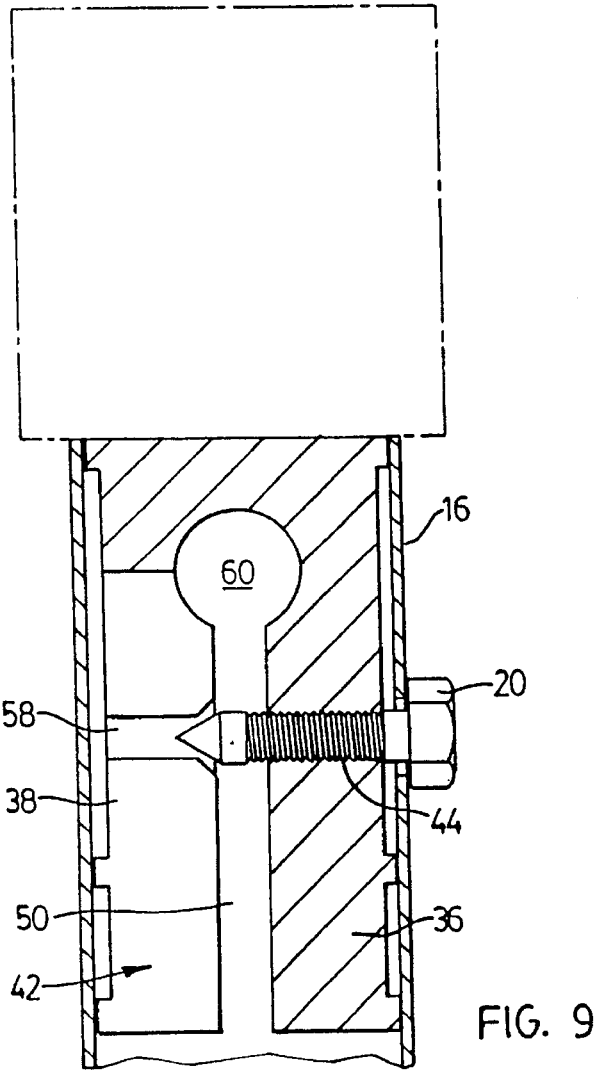
FIG. 9 is a horizontal elevation showing the operation of a screw cooperating with the fork of a connector constructed in the manner of FIGS. 2 to 5.

To explain this expansion action further, reference can be made to FIGS. 8 and 9 which illustrate the conically pointed bolt 20 extending through a tubular member 16 of square cross-section. The bolt 20 extends across a gap 50 located between the parallel arms and extends into the slit 42 formed between the two prongs of the second arm. Because the slit 42 is narrower than end cross-section 52 of the bolt, threading the bolt into the opening 44 will cause the conically pointed end of the bolt to push against bevelled corners 54 and 56 formed on the prongs 39, 40. This will not only cause the first and second arms to be spread apart in the direction A, but will also cause the two prongs to be spread apart in the direction B. If desired, the adjacent surfaces of the prongs in the region of the pointed bolt can be fanned with small channels or grooves 58 in order to better accomodate the pointed bolt and to permit it to be threaded into the hole 44 as far as necessary to make the joint secure. There is also shown in FIG. 9 a circular opening 60 preferably formed at the base of the first and second arms so as to enable them to expand readily under the action of the screw or bolt without causing either arm to fracture at its base. Similarly, at the base of the two prongs 39, 40, a further circular opening may be formed to accommodate the expansion or spreading apart of the prongs.

In the preferred embodiment of the connector, each arm includes spaced apart, transversely extending ribs 64 to 66. The use of the ribs permits a better contact or engagement between the exterior surface of the arms and the adjacent inner surfaces of the tubular member. The ribs are particularly desirable because, as the arm members are expanded, their opposite exterior surfaces do not remain parallel and thus, in the absence of the ribs, the amount of contact between the arms of the connector and the surrounding tubular member would be minimal. The use of the ribs or ridges increases the region of contact and increases the frictional forces that hold the fork in the tubular frame member.

Each connector can include a threaded fastener such as a bolt for mounting the connector to the support structure 10.

Figure 6:
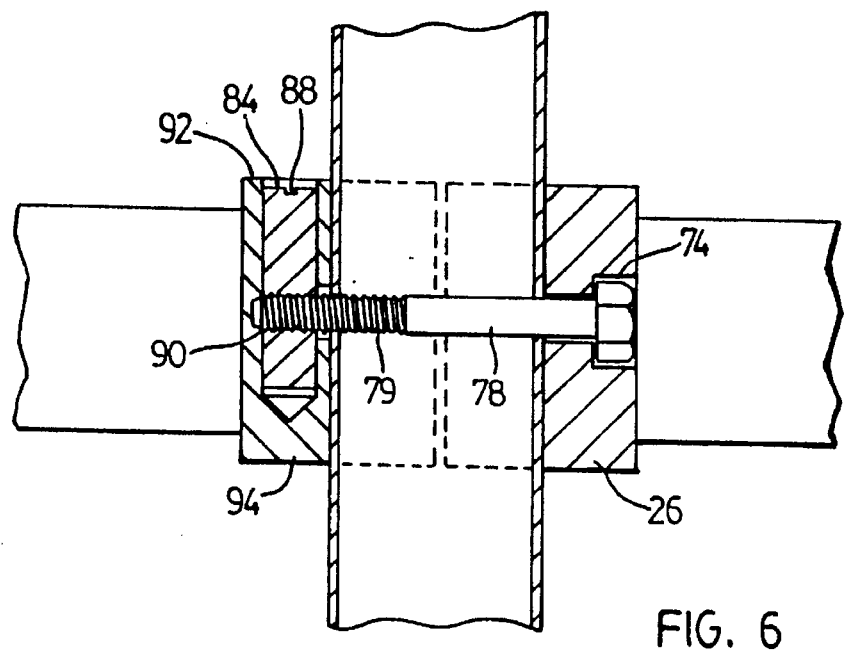
FIG. 6 is a cross-sectional elevation taken along the line VI—VI of FIG. 5.
Figure 7:
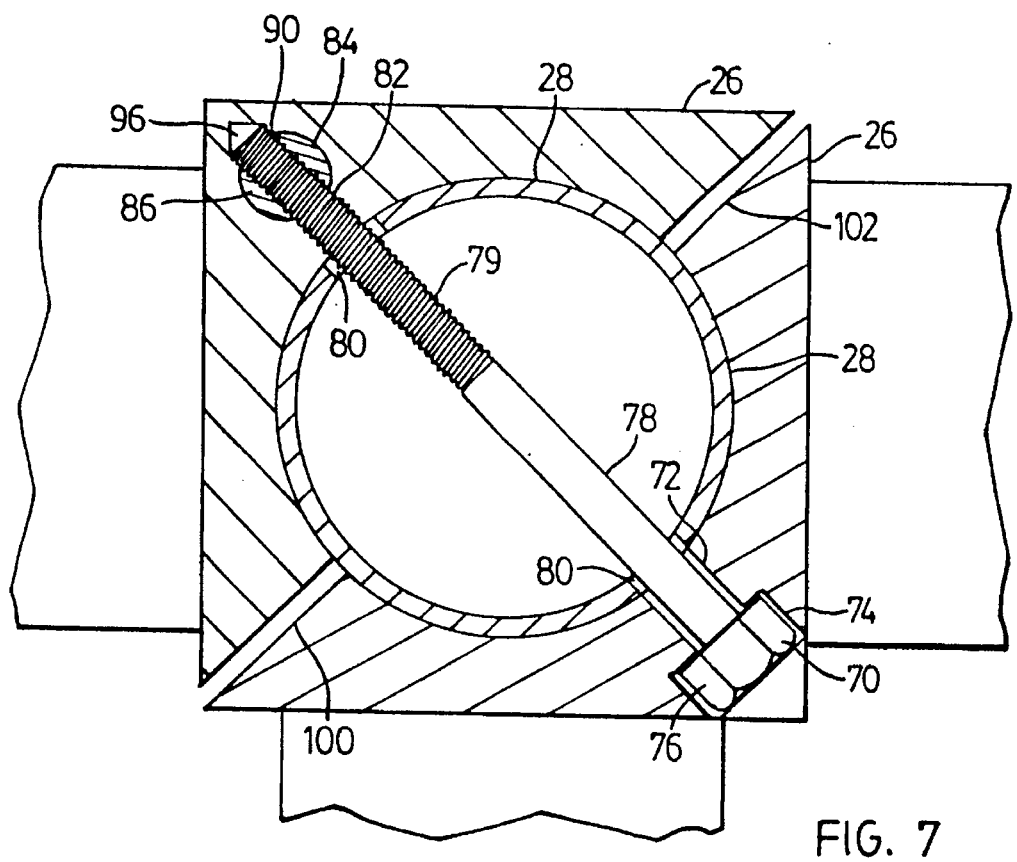
FIG. 7 is a horizontal cross-section of the base portions of the connectors shown in FIGS. 1 and 4, said view being taken along the line VII—VII of FIG. 4.

One such fastener is indicated at 70 in FIG. 1. This fastener extends through a hole 72 formed centrally in the base portion 26. Although the fastener 70 can be used simply to connect the base portion 26 directly to the support structure 10, in the preferred embodiment illustrated in FIGS. 1 and 5 to 7, it is also used to fasten support structure 10 to the base portion of another, similar connector and this can provide a very rigid, strong connection. As shown in FIGS. 6 and 7, the base portion 26 is preferably formed with a recess or cavity 74 sized to accomodate the head 76 of the bolt 70. The bolt 70 extends through an unthreaded aperture 72 that extends from the outer face to the inner face of the base portion. The bolt 70, which may have an initial unthreaded portion 78 and a threaded end portion 79 extends through aligned holes 80 formed in the tubular support. The threaded portion 79 extends into a threaded aperture 82 formed in the base portion of the opposite connector.

If desired, and in order to provide a stronger connector, the threaded portion of the hole 82 can be provided with a steel pin or plug 84 that has been pressed into a hole 86 formed in the base portion. As an example only, this hole 86 can be open at the top (as shown in FIG. 6) and can be closed at its bottom end. Preferably, a slot or other non-circular hole 88 is formed at the exposed end of the pin so that the pin can be turned in the opening 86 as required. As illustrated, the steel pin 84 extends parallel to a central axis of the inner face 28 when the latter forms a partial cylinder. The pin itself is formed with a threaded hole 90 for receiving the end of the bolt 70. The hole 90 is formed in a central section of the pin 84 and extends perpendicular to the length of the pin. In the preferred embodiment, the steel pin extends parallel to the inner and outer faces of the base portion and perpendicular to the flat end faces 92 and 94 of the base portion. Use of such a steel pin with internal threads provides a much stronger connector and joint as compared to the case where the base portion is simply made of a relatively soft metal such as aluminum or aluminum alloy and the hole 82 is simply threaded. For aesthetic reasons, the hole 82 can be closed at its end 96 so that this hole cannot be seen when the connector is being used and in place.

Figure 5:
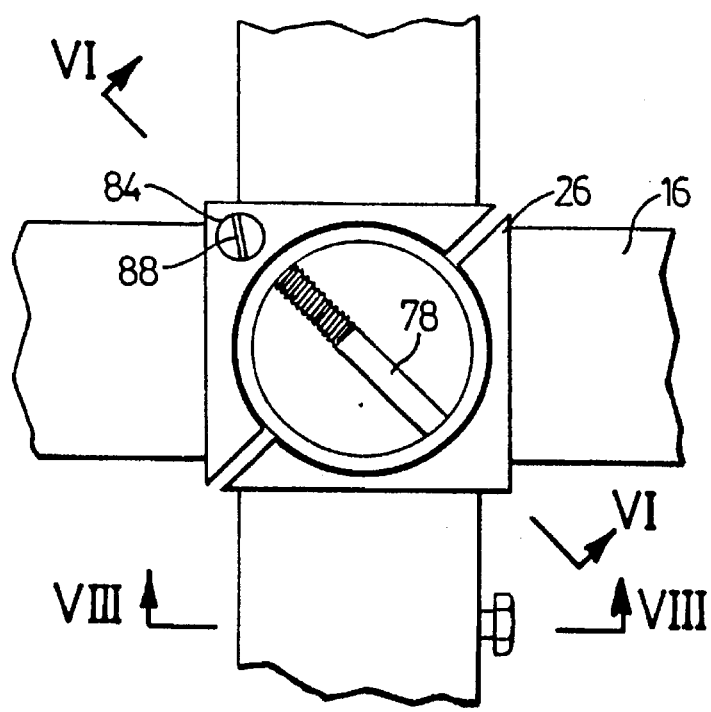
FIG. 5 is a top cross-sectional view of the connectors and tubular members of FIG. 1, only a short portion of the horizontal tubular members being shown.

As shown in FIGS. 5 and 7, the base portion 26 has two radially extending end surfaces 100 and 102 formed on opposite sides of the cylindrical inner face 28. These end surfaces either rest against or are slightly spaced from corresponding end surfaces of the other adjacent connector. In any event, the two base portions 26 of opposite connectors should clamp the tubular support structure between them so that there is a rigid joint which will not rattle or move even slightly when the structure is being used or stressed. Also, the outer face of the base portion 26 preferably is formed with a shoulder 104 as shown in FIG. 3, which shoulder snugly fits against the inner walls of the tubular member joined to the connector at this location. The shoulder 104 extends about the periphery of the fork 22, 24.

Figure 10:
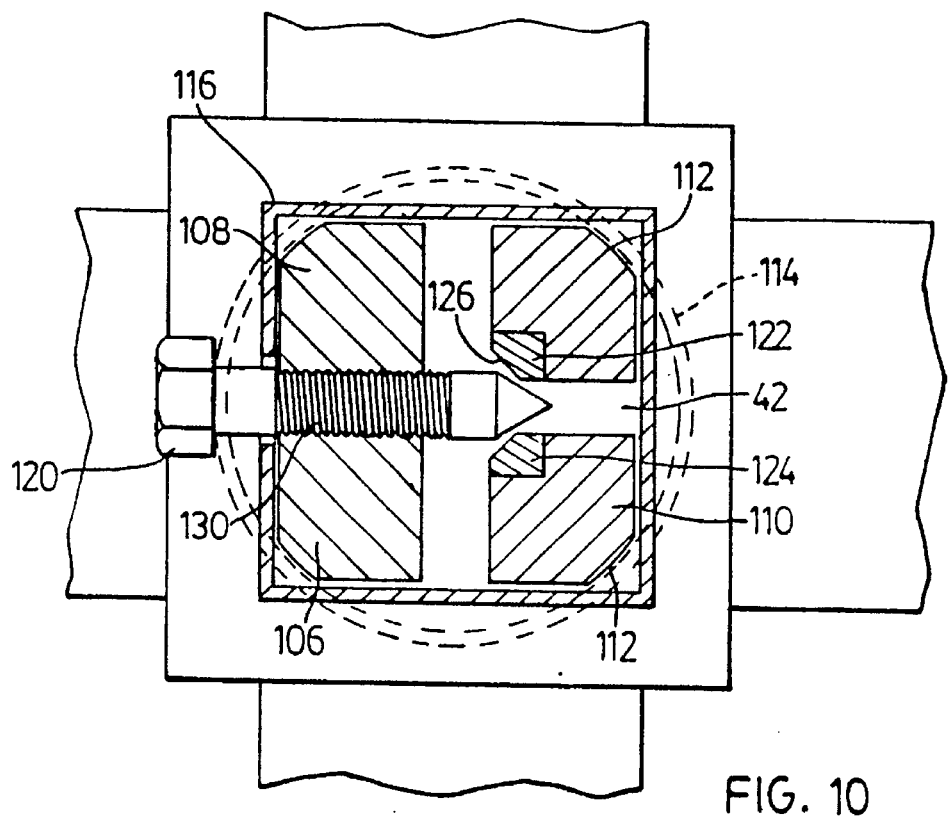
FIG. 10 is a cross-sectional view similar to that of FIG. 8 but illustrating another embodiment of the spreading mechanism that can be used to connect a tubular member with either a square or round transverse cross-section.

FIG. 10 illustrates another version of a connector constructed in accordance with the invention, which version employs a modified fork or spreading mechanism 106. In this version, the two spreadable arms 108 and 110 have rounded corners at 112. A connector with this type of fork is able to connect a tubular frame member having either a round or a rectangular cross-section. In FIG. 10 the round cross-section is indicated in dashed lines at 114 while a tubular member having a square cross-section is indicated at 116. As in the earlier versions, the second arm 110 is split into two parallel prongs that can be spread apart by means of bolt 120 having a pointed, conical inner end.

FIG. 10 also illustrates another preferred, optional emodiment of a connector constructed in accordance with the invention. In particular, the two prongs can be provided with metal inserts 122 and 124 to provide a tough, durable bearing surface which is engaged by the conical end of the bolt 120. For example, if the connector is made primarily of aluminum or aluminum alloy, these inserts can be made of steel which is much stronger and more wear resistant. If the connector is formed from a hard plastic, the inserts can be made from a stronger metal such as aluminum alloy or steel. The use of these inserts is recommended in the case of a connector made primarily of plastic material. Each insert can be formed with a sloping side 126 so that the threaded bolt 120 pushes against the sloping sides, thereby acting to expand the connector in two directions as explained above. The metal inserts can be held in place by initially threading the bolt 120 into the threaded opening 150 a sufficient distance so that the conical point of the bolt 120 engages against the inserts 122, 124.

Figure 11:
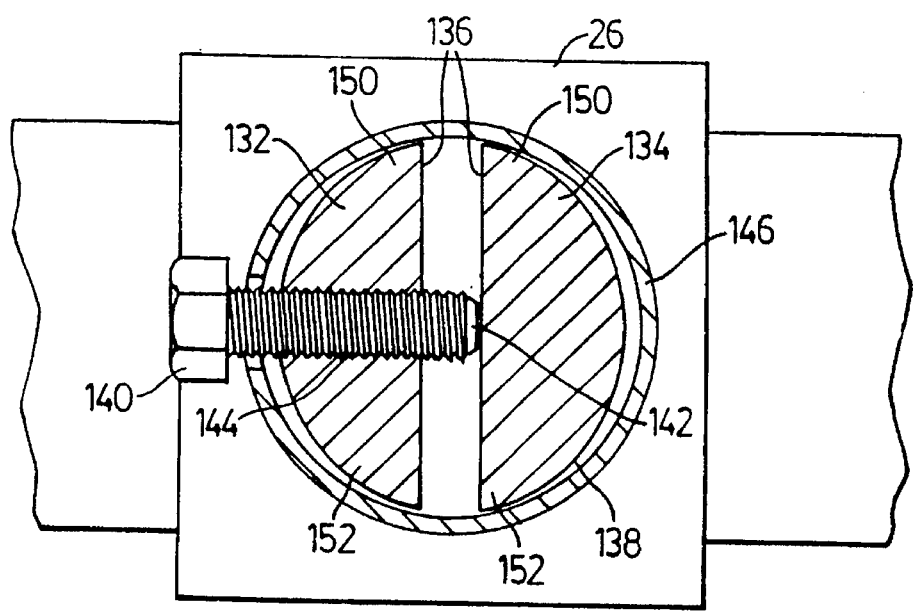
FIG. 11 is a cross-sectional view similar to FIG. 10 but showing an additional embodiment of the spreading mechanism in a connector constructed in accordance with the invention.

FIG. 11 illustrates another, simpler form of connector that can be used to join tubular frame members having a round transverse cross-section. In this embodiment of the invention the spreading mechanism or fork comprises first and second arms 132 and 134 which extend outwardly from the outer face of a base portion 26 of the connector. The base portion can be the same as in the other versions described above. Each of the arms has a flat inside surface 136 which faces the inside surface of the other arm and is spaced therefrom. Each arm also has a curved exterior surface 138 which can be substantially semi-circular or semi-elliptical in transverse cross-section as shown. A bolt member 140 which can have a flat inner end at 142 extends through threaded aperture 144 in the arm 132 and presses against the inside surface of the second arm 134.

Preferably, and as illustrated in FIG. 11, the radius of curvature of each arm 132, 134 is slightly greater than the inner radius of the tubular frame member 146 to be connected. This will provide stronger connection between the arms and the inside surface of the tubular frame member. This is because the cross-sectional shape of the arms will be distorted to some extent by the pressure exerted by the bolt 140 as it is threaded further into the opening 144. This distortion will tend to push the upper and lower extremities of the arms indicated at 150 and 152 outwardly against the sides of the tube in a direction substantially perpendicular to the central axis of the 140. Thus, as in the embodiments employing one arm which is split, this embodiment also can produce outward pressure on the tubular frame member in two directions which are substantially perpendicular to one another thereby creating a very strong connection.

Figure 2:
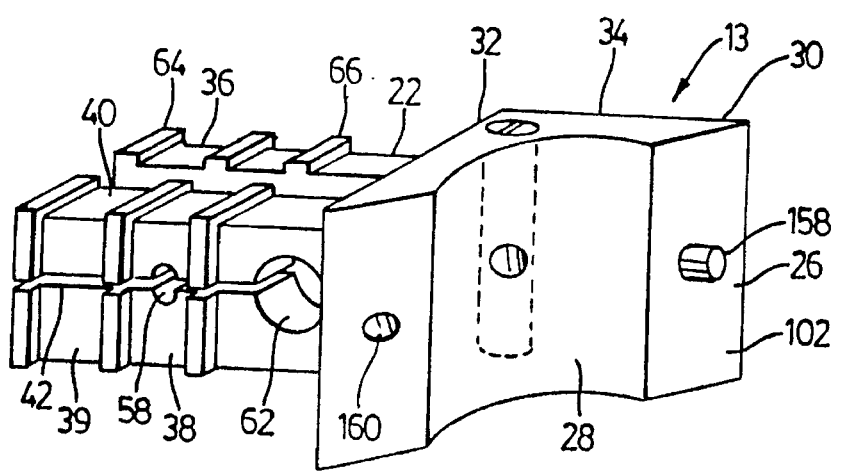
FIG. 2 is a perspective view of a preferred form of connector, which view shows the inner face of the base portion and the top surface of the connector.

Another preferred and optional feature of the connector is illustrated in FIG. 2 and comprises forming the base portion 26 with a mating pin 158 in the center of one end surface 102 and a corresponding mating hole 160 in the other end surface. The use of such holes and pins can help to provide a proper alignment of opposite connectors 13, 14 of the invention on a tubular support. It will be understood that the opposite connector will also have a pin 158 which will fit snugly in the hole 160 of the first connector and will have its own hole to snugly accomodate the pin 158 of the connector.

Figure 12:
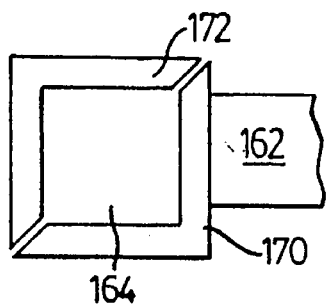
FIGS. 12 to 17 are schematic illustrations illustrating how connectors constructed in accordance with the invention can be used to connect one to as many as four tubular members to a support structure or to a tubular frame member.
Figure 13:
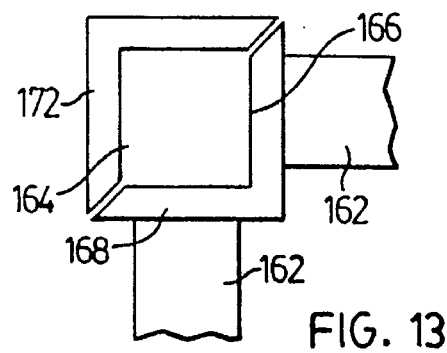

FIGS. 12 and 13 of the drawings illustrate schematically connectors constructed in accordance with the invention which can be used to connect tubular frame members 162 to a support structure 164 having a square cross-section. In these connectors the inner face 166 of the connector forms two planar surfaces that are perpendicular to one another. The connector 168 is formed with two forks so as to permit the attachment of two tubular frames 162 while the connector 170 of FIG. 12 is formed with a single fork to receive a single tubular frame member. These figures also illustrate the use of a special connector 172 formed with no outwardly projecting fork. This connector is simply used to clamp the opposite connector 170 or 168 to the supporting member 164.

Figure 3:
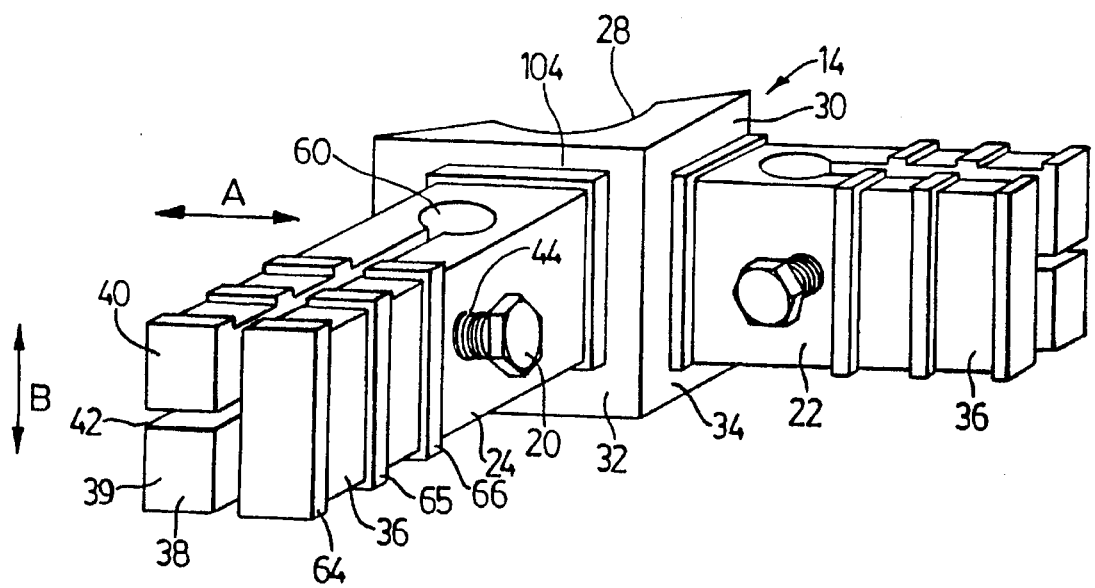
FIG. 3 is a perspective view of another embodiment of the connector, this embodiment having two forks or spreading mechanisms.
Figure 4:
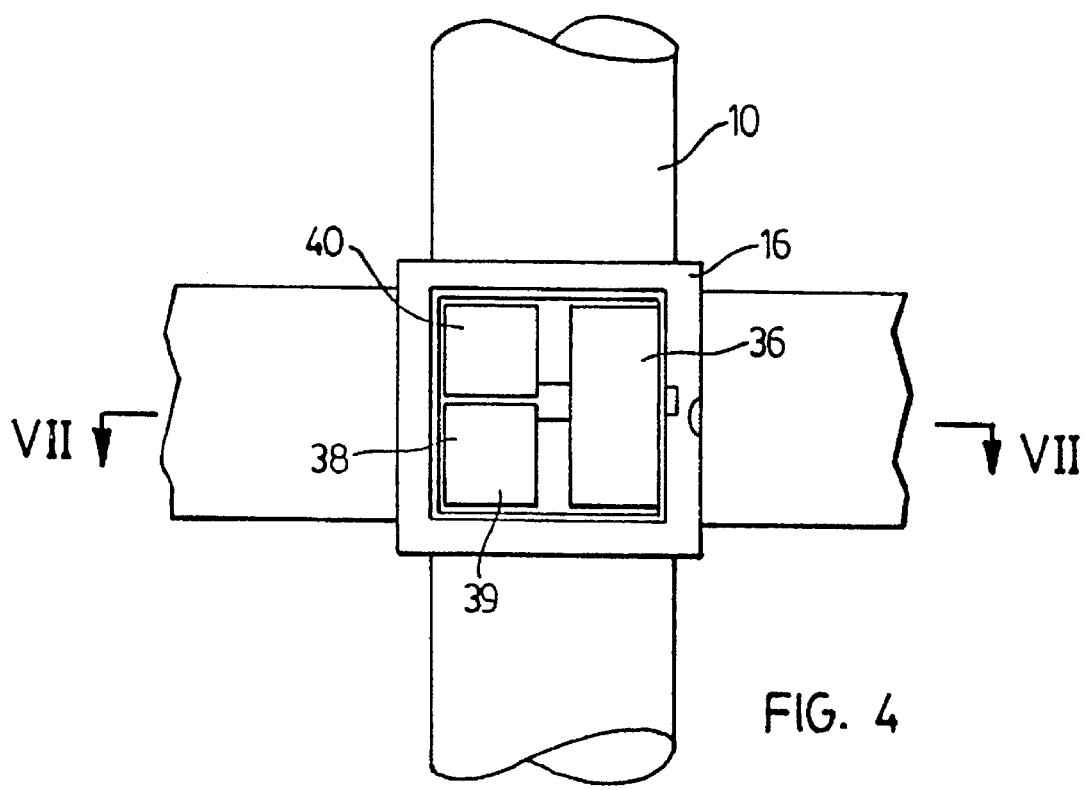
FIG. 4 is a side elevation of the connectors and tubular members shown in FIG. 1, this view being taken from the end of one of the tubular members having a square cross-section.
Figure 14:
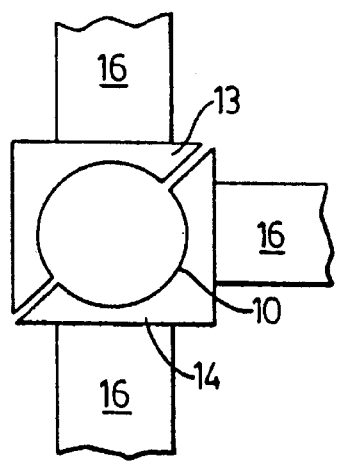
Figure 15:
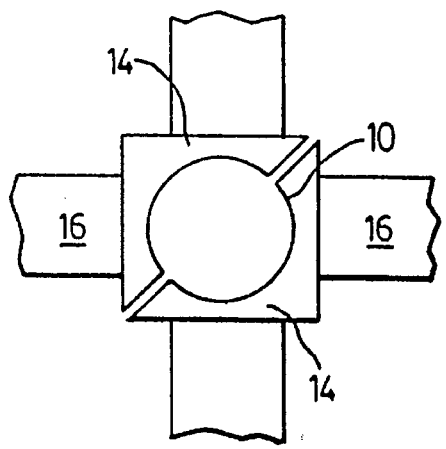

FIGS. 14 and 15 simply illustrate how the connectors shown in FIGS. 2 and 3 can be used to join tubular frame members 16 to another tubular frame member 10 having a circular transverse cross-section. A connector 13 having a single fork can be mated with a connector 14 having two forks in order to connect three of the frame members 16 at one location on the support structure 10 (see FIG. 14). In FIG. 15 (corresponding basically to the version of FIG. 1) two identical connectors are used to join four of the tubular members 16 to the structure 10.

Figure 16:
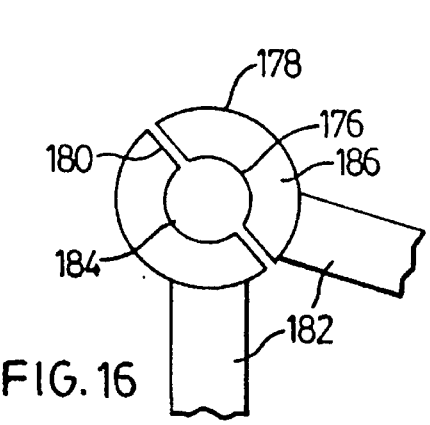
Figure 17:
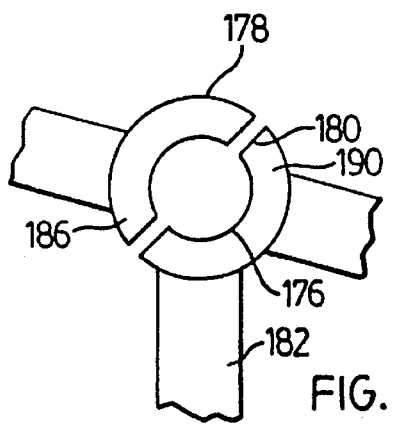

FIGS. 16 and 17 schematically illustrate other forms of connectors each with a semi-cylindrical inner face 176 and a semi-cylindrical outer face 178. These two faces are joined by radially extending end faces 180. This type of connectors can be used to join tubular frame members 182 to a tubular frame 184 having a round external cross-section. In the version of FIG. 16, each connector 186 has a single fork that extends at an angle, for example 45 degrees to the plane of the end faces 180. In the construction shown in FIG. 17, one of the connectors has a single fork while the other connector 190 has two forks that extend at an angle of less than 90 degrees to one another. It will be readily apparent to one skilled in this art that a wide variety of connectors constructed in accordance with this invention can be made. The construction and arrangement of the connector will depend upon the particular use to which it is to be put, the number of tubular members to be connected at the location of the connector and the relative angles between these tubular frame members.

Connectors according to the invention can be made from a variety of materials with the choice of the material depending upon such factors as the strength of connector required for the job, the durability required, safety factors, etc. Possible materials include such preferred materials as aluminum, aluminum alloy and hard plastic. It is also possible to use such metals as bronze and steel for some connector applications. These connectors can be made in a variety of sizes with larger connectors being used in such applications as playground equipment, sound and concert stages and flooring.

It will be readily apparent to one skilled in the art of tubular connectors that various modifications and changes can be made to the illustrated preferred versions of the connectors of this invention. Accordingly, all such modifications and changes as fall within the scope of the appended claims are intended to be part of this invention.

I claim:

1. A connector for joining one or more tubular members to a support structure, comprising:

a first one-piece base portion having an inner face and an outer face, a second one-piece base portion having an inner face and an outer face, said second base portion being separate from and engageable with said first base portion, whereby the inner faces of the first and second base portions form an opening therebetween for resting firmly against said support structure to permit a rigid joint between said connector and said support structure;

the outer face of the first base portion having at least one fork extending outwardly therefrom and being dimensioned for closely fitting to an internal cross-section of a tubular member;

said fork having substantially parallel and spaced apart first and second arms, the second arm being further subdivided into two parallel prongs having a slit therebetween, said first arm having a transverse threaded hole therethrough aligned with said slit, whereby a threaded member is screwed into said transverse threaded hole and extends into said slit to push against said prongs to expand said first and second arms apart in a first direction and expand said prongs apart in a direction substantially normal thereto.

2. The connector according to claim 1, wherein the connector includes threaded fastener means for mounting the connector to said support structure.

3. The connector according to claim 2, wherein said support structure is a tubular support member and each of said inner faces of said first and second base portions is semi-cylindrical with a radius for corresponding to an outer surface of said tubular support member.

4. The connector according to claim 3, wherein said each of said base portions has two radially extending end surfaces formed on opposite sides of the respective inner face whereby said end surfaces of the first base portion correspond and face said end surfaces of the second base portion.

5. The connector according to claim 2, wherein said fastener means is adapted to fasten said first base portion to said second base portion disposed confrontationally to said first base portion.

6. The connector according to claim 2, wherein said fastener means includes a threaded hole terminating on the inner face of one of said base portions for receiving a fastening bolt adapted to pass transversely through said support structure for connecting said connector to the support structure.

7. The connector according to claim 1, wherein a steel pin is disposed centrally in one of said base portions and extends parallel to a central axis of said inner faces which form a cylinder, the pin having a transversely extending threaded hole therein for receiving a threaded fastener adapted to pass transversely through said support structure for connecting said connector to the support structure.

8. The connector according to claim 1, wherein said first and second arms include transversely extending ribs thereon for contacting inner walls of the tubular member for connecting to said connector.

9. The connector according to claim 1, wherein said first and second arms have rounded corners and are suitable for connecting to said tubular member having either a round or rectangular exterior cross-section.

10. The connector according to claim 1, wherein the outer face of said first base portion includes a shoulder for snugly fitting against inner walls of said tubular member for joining said tubular member to said connector, said shoulder extending about a periphery of said at least one fork.

11. The connector according to claim 1, wherein the connector is formed from aluminum or aluminum alloy.

12. The connector according to claim 1, wherein the connector is formed from a hard plastic.

13. The connector according to claim 1, wherein metal inserts are mounted in and supported by said prongs and are located on opposite sides of said slit, wherein said threaded member pushes against sloping sides formed at the metal inserts.

14. The connector according to claim 1, wherein said first base portion includes a plurality of said forks arranged in same plane about said outer face of the first base portion.

15. The connector according to claim 1, wherein said slit includes an inclined indentation at its inner end for matingly accepting a pointed conical shaped end of said threaded member.

16. The connector for joining hollow elongate frame meters to a support structure, comprising:

a first one-piece base portion having an inner face and an outer face, a second one-piece base portion having an inner face and an outer face, the second one-piece base portion being separate from and engageable with said first one-piece base portion, wherein said inner faces of said first and second base portions form an opening therebetween for conforming to a shape of an adjacent surface of said support structure for being joined thereto;

at least one spreading mechanism extending outwardly from said first base portion and having external transverse dimension for enabling the spreading mechanism to be inserted into one end of one of said elongate frame members and to fit closely within an internal cross-section of said respective elongate frame member;

said spreading mechanism having substantially parallel first and second arms located adjacent to each other, said second arm being further subdivided into two parallel prongs having a slit therebetween, said first arm having a transverse threaded hole extending therethrough and being aligned with said slit; and an elongate threaded member located in said threaded hole and able to be turned in said threaded hole so as to extend into said slit and push said prongs apart and thereby also spread said first and second arms apart, wherein said first base portion has an aperture formed therein to receive an elongate fastener for connecting said first base portion to said support structure, said aperture extending from said outer face to said inner face of said first base portion and having a central axis, said central axis extending at an acute angle to longitudinal axes of said first and second arms.

17. The connector according to claim 16, wherein one of said first and second arms has a flat inside surface facing in confrontational relationship to a flat inside surface of another of said first and second arms and spaced therefrom and each of said first and second arms has a curved exterior surface.

18. The connector according to claim 17, wherein each of said inner faces of said base portions has semi-cylindrical face for connecting said base portions to said support structure which is a tubular member with a round transverse cross-section and each of said outer faces of the base portions is divided into two planar surfaces that extend perpendicular to each other.

19. The connector according to claim 16, wherein said connector is formed from aluminum or aluminum alloy.

20. The connector according to claim 16, wherein said elongate threaded member is a bolt with a pointed conical inner end.

21. The connector according to claim 16, wherein said first and second arms are formed with transversely extending ribs thereon for contacting inner walls of said respective elongate frame member.

22. The connector according to claim 16, wherein one of said base portions has a further hole formed therein and a steel pin is held in said further hole, said steel pin extending parallel to said inner and outer faces of said one of said base portions and parallel to a longitudinal axis of said support structure, and wherein a threaded hole is formed in said pin in a central section thereof, said threaded hole of the pin extending perpendicular to a length of the pin and adapted to threadably receive said elongate fastener for securing said connector to the support structure.

* * * * *